115V. AC INPUT FROM CONTROL TRANSF.

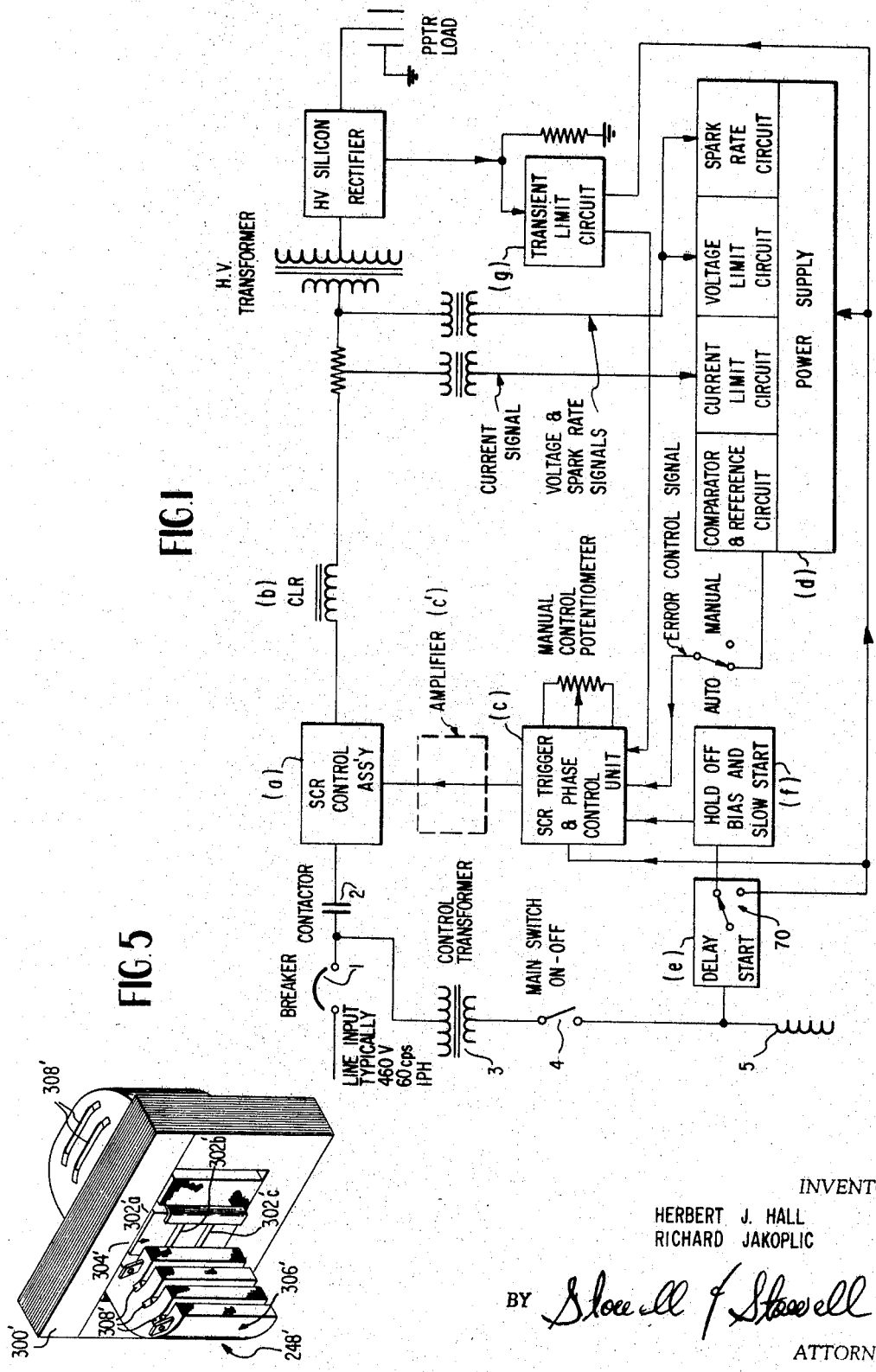

United States Patent Office 3,507,096
Patented Apr. 21, 1970

3,507,096
METHOD AND APPARATUS FOR AUTOMATIC VOLTAGE CONTROL OF ELECTROSTATIC PRECIPITATORS
Herbert J. Hall, Skillman, and Richard Jakoplic, Somerset, N.J., assignors to Research-Cottrell, Inc., Somerset, N.J., a corporation of New Jersey
Filed Mar. 7, 1967, Ser. No. 621,279
Int. Cl. B03c 3/68; G05f 1/40
U.S. Cl. 55—105   17 Claims

ABSTRACT OF THE DISCLOSURE

An apparatus which automatically controls an electrostatic precipitator by employing solid-state components in combination with a current limiting reactor. A firing signal means is provided for placing the solid-state components in a conductive state. A magnetic device whose state of magnetic core saturation governs the generation of the firing signals. A delayed start and soft start means is provided for applying line voltage to the solid-state components before firing signals are supplied to the solid-state components. A means is provided for making the firing signals responsive to operating parameters of an electrostatic precipitator, such as sparking rate, voltage and current. A linear reactor is provided to protect the solid-state components.

BACKGROUND

This invention relates to the art of electrostatic precipitation and, more particularly, to an automatic voltage and power control system using silicon-controlled-rectifiers (SCR's), or more generally, solid-state thyristors, for energizing electrostatic precipitators. Electrostatic precipitators are widely known in the gas cleaning art and are extensively used in a variety of industrial processes to remove particulate matter from gases. One of the basic problems encountered in the application of electrostatic precipitators relates to achieving stable, reliable, and effective, wide-range automatic control of the voltage applied to the high voltage transformer-rectifier which supplies the required high voltage to the electrodes of the precipitator. With the advent of what is now known as solid-state devices, workers in this art have attempted to incorporate solid-state devices, such as thyristors, into the automatic control systems for electrical precipitators. The solid-state devices exhibit obvious advantages over other power control elements, as for example, smaller volume and weight, high electrical efficiency with high power handling capacity, rapid rate of response to certain control potentials, wide range of control ability with very low power control signal levels, long service life, to mention only a few important and desirable properties. However, workers in this art have found that straightforward substitution of solid-state counterparts for certain prior art elements in voltage control systems has been less than satisfactory, and even unworkable, particularly when used in high power precipitator rectifier sets which, in recent years, have been used in increasingly larger numbers.

OBJECTS OF THE INVENTION

A primary object of this invention is to provide a stable, full-range, automatic control system with solid-state devices such as SCR's in combination with novel current-limiting-reactors, hereinafter referred to as "CLR," and in combination with a plurality of control signals for regulating the voltage of the precipitator.

It is a further principal object to provide an automatic voltage control system in which the elements of SCR, CLR, HV power transformers, and a plurality of control parameter signals and/or functions are designed in effective combination especially adapted to the control of electrical energization of precipitators to achieve stable, high-efficiency performance including sparking load conditions and high-power operation.

According to the practice of the invention, these and further objects and advantages are realized—including:

(1) Improved waveform control by the CLR—yielding reduced rate of rise of current minimizing transient disturbances; increased current conduction capability to obtain higher average power output and electrical circuit efficiency; peak current limitation essential during precipitator sparking; easing duty on SCR's—permitting smaller rating solid-state devices to be used with reliability and lower cost. In addition, the reduced rate of current rise $di/dt$, with effective transient current control plus improved waveform eases duty and improves reliability of HV silicon rectifiers feeding the precipitator.

(2) Use of novel, transient feedback control signal which operates with fast response to turn off gate firing pulse to the SCR's for 1 cycle following an excessive transient current in the power circuit which occurs due to precipitator sparking. Such fast, automatic turn off stabilizes precipitator operation and inhibits unbalance in the magnetic circuit of the high voltage transformer. This latter effect in combination with the CLR prevents current carryover and excessive magnetic circuit disturbance which otherwise could cause failure of the SCR or frequent protective fuse blowing.

(3) A predetermined delay in the operation of the voltage regulating system is employed to preclude the uncontrolled firing of an SCR due to turn-on voltage transients when main line voltage is first applied to the control.

(4) An important "slow-start" feature is used to provide a slowly increasing strength of gate firing signal to the solid-state devices, thus allowing gradual increase (from zero) of precipitator transformer primary voltage and current to a point where an automatic control parameter becomes effective to govern the operating level of the system. This eliminates severe transient circuit disturbances through sudden application of high power loads. Examples of such control parameters are precipitator spark rate, current, and voltage. Their use to effect automatic voltage and power control may be seen in U.S. Patent 3,147,094.

(5) In comparing, for example, some important advantages of the system of the present invention to that of the prior art there is achieved:

(a) For a given HV transformer kva. rating, 15 to 20 percent or more increase in average corona power input to the precipitator depending upon load level. This is due to specially designed system with CLR and increased current conduction timer per cycle, plus fast transient response and precipitator voltage recovery following a spark.

(b) Full-range voltage and current control (0 to 100% rating). This may be compared to partial range control typically used with saturable reactors as the control element in the HV transformer primary circuit.

(c) Reduced peak current and improved "form factors," i.e., ratio of RMS to average current and ratio of peak current-to-average or DC current.

(d) Faster response and control with precipitator sparking to minimize transient disturbances and eliminate magnetic circuit unbalance. These effects, improperly controlled, reduce average voltage on the precipitator and tend to perpetuate sparking in rapid bursts, both of which reduce precipitator collection efficiency.

(e) Elimination of turn-on transients, of increasing importance with high-power rectifier sets.

(f) Large savings in control equipment size and weight. Total weight savings, for example, in a precipitator control system for 1000 ma. DC output, amount to about 1000 lbs. According to the present invention, smaller control cabinets of uniform size for all power ratings are used with appropriately rated HV transformer-rectifier sets to yield a two component system.

(g) Improved electrical efficiency and reduced heat losses with order 8–10% less power input for about 15 to 20% or more power output at full load rating.

(h) Improved transient response plus reduction in magnitude and duration of peak current during sparking minimizes precipitator discharge wire burning and subsequent breakage, thus improving reliability and life, reducing maintenance and costly shut-downs for repairs.

These advantages and features are of increasing importance in application to high power rectifier sets, and in the maintenance of continuous, optimum electrical energization to achieve maximum precipitator collection efficiency so vital to modern industrial processes and air pollution control.

Other advantages realizable by the practice of the present invention will be apparent to those skilled in the art from the following description:

In the drawings:

FIGURE 1 shows a basic functional block diagram of the system of the invention.

FIGURES 1a and 1b, to be viewed when placed side by side, define a schematic representation of an automatic voltage control circuit according to the present invention.

FIGURE 3 illustrates a modification of the circuit portion shown in FIGURE 1a.

FIGURE 5 illustrates a typical construction for the current-limiting-reactor.

Figure 1A:
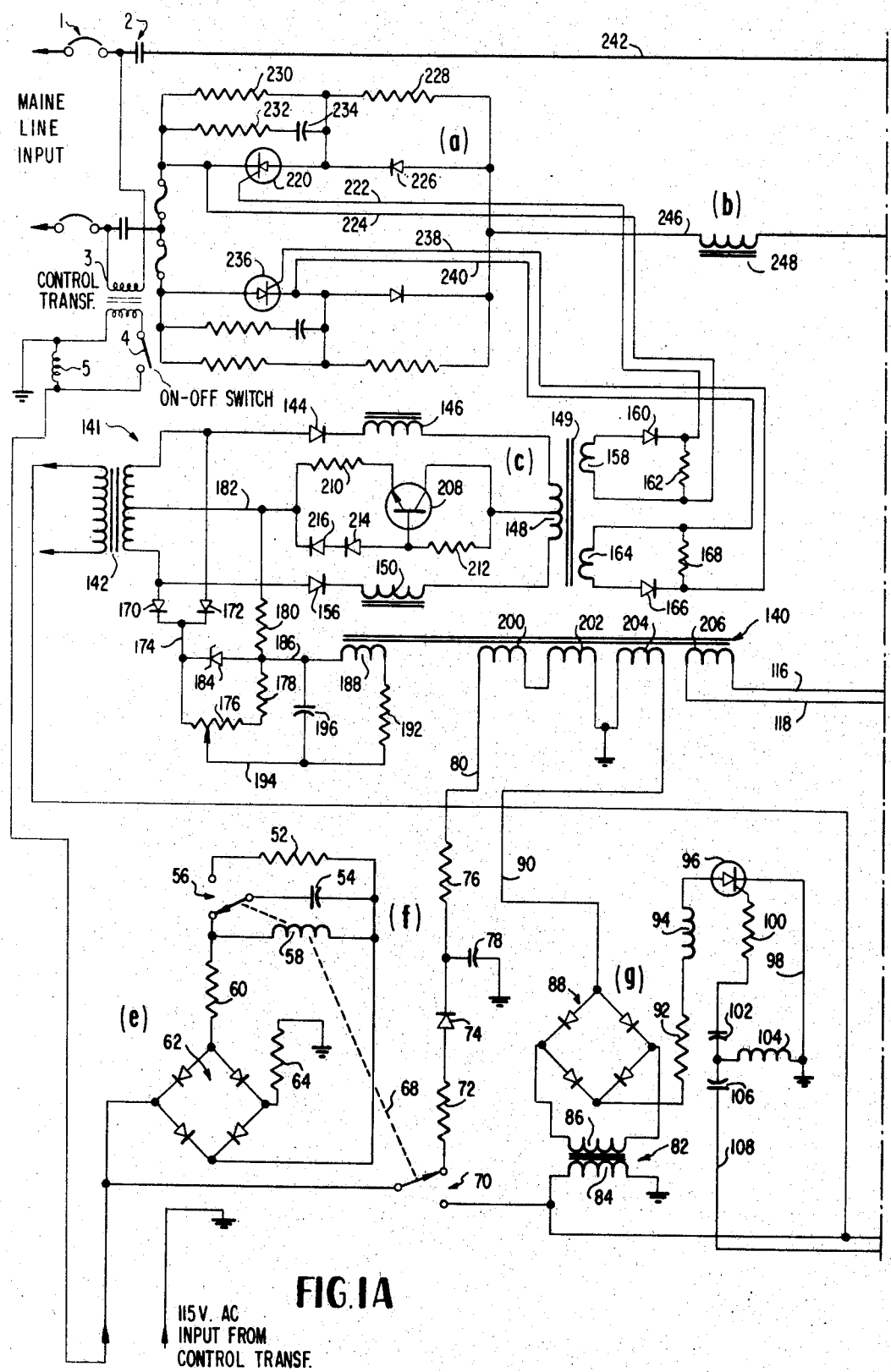

To facilitate an understanding of the invention, the description which follows will be divided according to the various functions of the several sub-combination circuits which define the entire system.

Referring to FIG. 1 the control system generally includes a control assembly (SCR) (a); current-limiting-reactor or (CLR) (b); SCR trigger and phase control unit (c); automatic control circuit with multiple signal inputs, comparator and reference circuits (d); delay and switching circuit (e); holdoff bias and slow start circuit (f); and transient limit circuit (g). As shown in broken lines in FIG. 1 the SCR trigger and phase control unit (c) may be used in conjunction with an amplifier (C') as required for high power SCR's.

The system shown in FIG. 1 operates generally as follows:

Line input voltage, typically 460 v. 60 c.p.s. 1 phase, is applied through circuit breaker 1 to contacts 2 and energizes control transformer 3.

Closing of the main ON-OFF switch 4 energizes the contactor coil 5 of contactor 2 which applies line voltage to the main SCR's (a), energizes the delay and switching circuit (e), and also energizes the hold-off bias circuit (f).

The circuit (f) applies bias to the cut off triggers to the main SCR's (a) to thus prevent spurious firing when trigger circuit (c) is subsequently energized.

After a predetermined delay period, typically 2 seconds, switch 70 transfers power from the hold-off bias circuit (f) to the operating and automatic control circuits (c), (d), and (g).

The hold-off bias (f) slowly decays and, concurrently, the trigger voltage to main SCR's (a) is gradually applied, starting from zero conduction angle, to a point where one or more of the automatic control signals (d) takes over and establishes the appropriate phase angle for the SCR conduction and precipitator energization at a corresponding dynamic balance level.

As noted above, the transient signal control channel has been energized and acts as subsequently described to cut off trigger to the SCR's (a) for 1 cycle following an excessive transient signal due to precipitator sparking and thus maintains control stability in cooperation with the CLR (b) and the overall circuit design.

Provision may be made in the system for manual control for special purposes such as testing and maintenance while normal operation is automatic. However, the important functions of initial delay, slow-start and transient feedback stabilizing circuit (g) are active in both manual and automatic control modes.

DELAY START

Referring now to FIGURE 1a of the drawings, the numeral 52 denotes a resistor coupled across capacitance 54 by means of the contacts of a SPDT switch 56. The numeral 58 denotes the energizing coil of a relay which controls the contacts of switch 56. The numeral 60 denotes a resistor fed from a rectifier circuit 62, the latter being connected through resistance 64 to ground, the resistance 64 limiting the current to rectifier circuit 62. Power to the rectifier 62 is supplied by an indicated 115 v. AC source. The numeral 68 denotes a mechanical connection between the switch 56 and SPDT switch 70, also of the same relay. In operation, these described elements effect a delayed start of the automatic voltage control system in the following manner. Assuming a potential across the rectifier 62, a voltage appears across the resistor 60 and begins to charge capacitor 54. At this time, the switch contacts 56 and 70 of the relay are in the indicated positions. After approximately 2 seconds, the capacitor 54 becomes charged to approximately 20 volts, this being sufficient potential to energize the relay coil 58. The switches 56 and 70 now assume configurations opposite to these illustrated, with the capacitor 54 thereafter discharging through resistance 52. During this 2-second interval, any unstable line conditions due to turn-on become stabilized before applying voltage to certain other circuits, to be described below. Futher, this action assures complete discharge of capacitor 54 so that the timing cycle will be the same each time the precipitator is energized. This delay start feature of the invention allows line voltage to be applied to the main thyristor elements (later to be described) before the application of any gate signals thereto.

SLOW START

Also during the initial 2-second delay period, the 115 volt supply is fed through the (illustrated) closed contacts of switch 70 to resistor 72, diode rectifier 74, and resistor 76. Capacitor 78 is charged by the diode, this charging holding a saturable reactor 140 (later to be described) coupled to line 80 in a cut-off condition. After the 2-second delay, the configuration of switch 70 changes, and capacitor 78 now slowly discharges through resistor 76 and the bias windings 200 and 202 of 140, thereby causing a gradual reduction of bias voltage, this gradual reduction slowly turning on the main SCR elements (later to be described). Thus, the conduction of the main SCR elements increases slowly up to a point where one of the control parameters governs operation.

FAST TURN OFF

Next a description will be given of that part of the circuit which turns off the firing signal to the main SCR elements for one cycle whenever a substantial transient current occurs in the electrostatic precipitator. This portion of the circuit is particularly effective when the precipitator is running at about one-half rated current or lower. It stabilizes the operation of the entire circuit and serves to preclude magnetic unbalance of the high voltage transformer which energizes the precipitator. The numeral 82 denotes a transformer having windings 84 and 86, the latter feeding the input terminals of a rectifier array 88 comprised of conventional diode elements and coupled as indicated, with the negative terminal of the array coupled by line 90 to the bias winding 204 of magnetic amplifier control windings 140. Winding 84 is connected to one terminal of switch 70. The positive side of the rectifier 88 is coupled to resistor 92, inductance 94 and SCR 96, with the cathode of the latter coupled directly to ground through line 98. The numeral 100 denotes a resistor coupled to the gate or trigger of SCR 96, in turn coupled to a T filter comprising condenser 102, inductance 104 and condenser 106. It will be observed that line 108 is coupled to the positive terminal of a full wave rectifier 109 (FIGURE 1b) coupled to the high voltage transformer which supplies the electrostatic precipitator 111.

In the event of a transient current originating in the precipitator, the high frequency component thereof passes through condensers 106 and 102 and resistance 100. This causes a firing potential to appear on the gate of the SCR 96, turning it on. With the SCR turned on, current starts to flow through inductance 94, resistor 92 and the bias winding 204 of magnetic amplifier control windings 140, biasing the latter to shut off conduction of the main SCR power units, causing them to become biased off. This action cuts off the main SCR elements for about one cycle, allowing the entire voltage regulating system to stabilize. The one cycle cut off time is established by the bias windings in 140 and inductance 94. The control signal, initiating the action described, when derived from the high voltage transformer secondary return on line 108, automatically is 180° phase delayed for proper synchronization in turning off the main SCR gates compared to the subsequent half-cycle AC following the transient occurrence. This action is very rapid and cannot be noticed or seen on various meters which may be included on conventional control panels or the like associated with such a voltage regulating system.

PLURAL CONTROL PARAMETERS

Figure 1B:
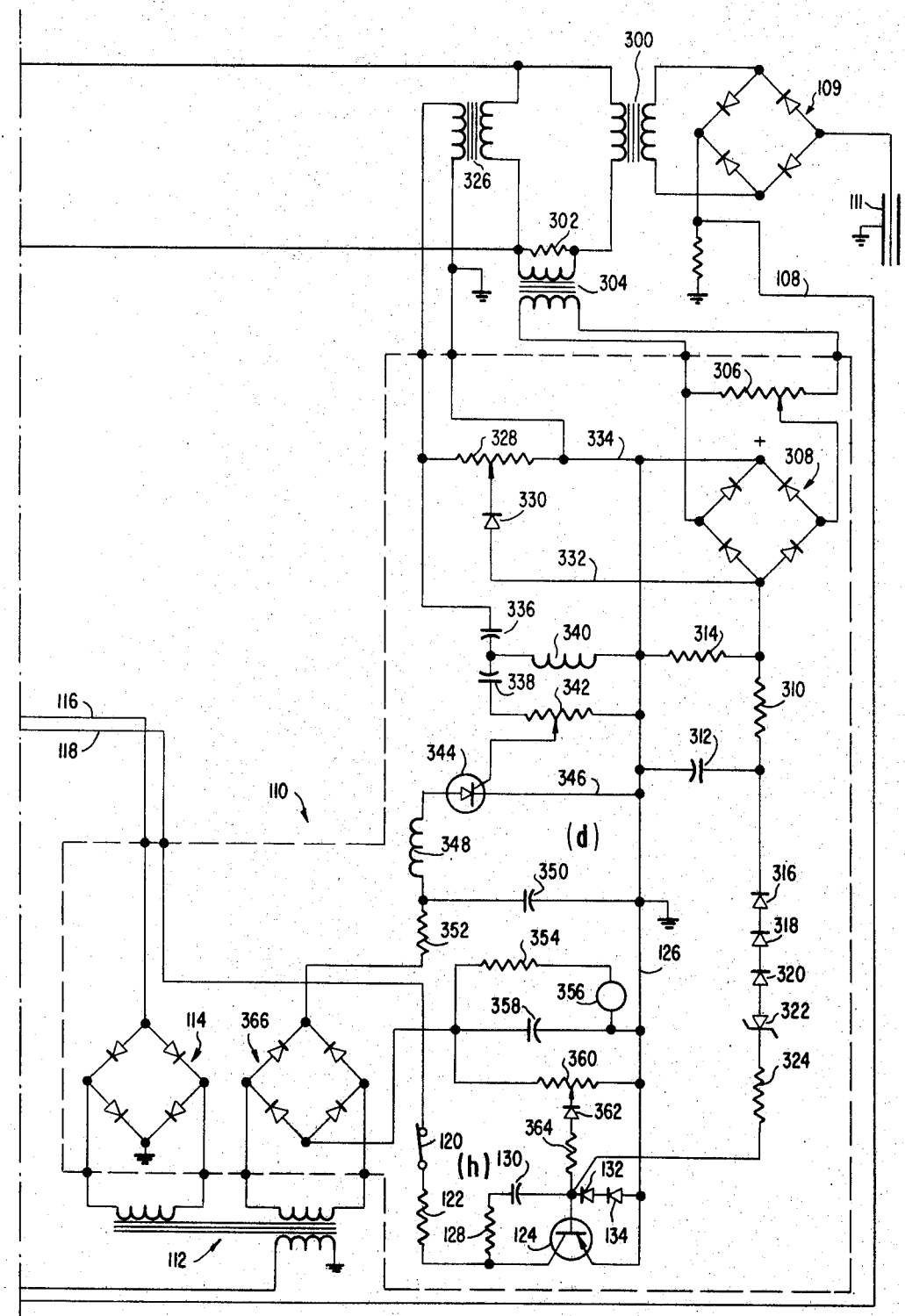

Turning now to that portion of FIGURE 1b denoted by the numeral 110, the elements thereof may be regarded as defining a subcombination circuit which functions to collate a plurality of error signals (corresponding to control parameters) to generate a single control signal, with the spark rate, voltage and current being employed as suitable control parameters. The reader is again referred to U.S. Patent 3,147,094 which sets forth the advantages realized by employing a plurality of parameters in an automatic voltage control system.

The numeral 112 denotes a transformer having two secondaries, each of which is connected to a rectifier array. The first rectifier array is denoted by the numeral 114 and its positive terminal is connected to ground. The negative terminal thereof passes to line 116 to a bias coil 206 in magnetic amplifier control windings 140 and thence through return line 118 to switch 120 and resistor 122, thence to the collector of transistor 124 and through the emitter to line 126 to ground.

Resistor 128 is placed in series with a capacitor 130 and both are connected across the collector-base of transistor 124. A pair of clamping diodes 132 and 134 are connected as indicated across the emitter-base to limit the base emitter voltage in the event of excessive control signals.

Figure 2A:
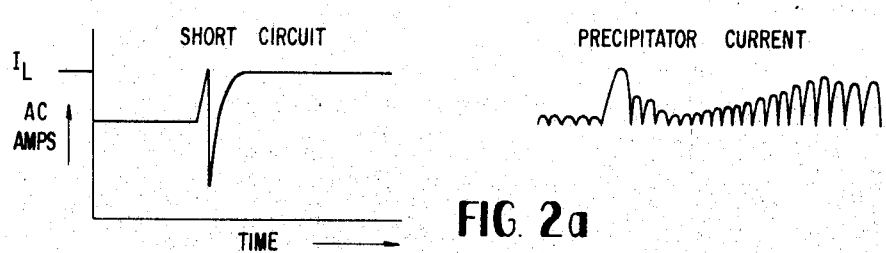
FIGURES 2a and 2b show the effect of the presence of a feedback circuit in FIGURE 1b.
Figure 2B:
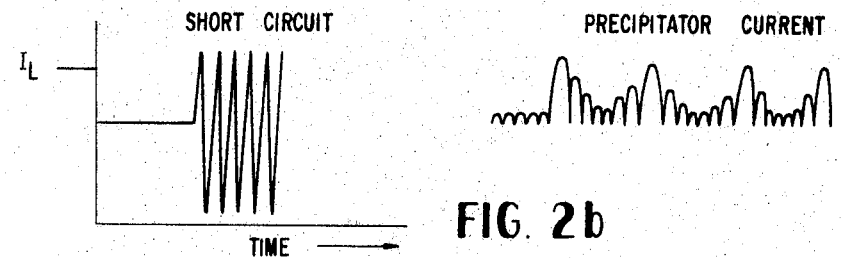

Transistor 124 functions as a variable resistor in the sense that its collector to emitter resistance is a function of base signal voltage. The higher the base voltage, the lower the collector to emitter resistance. When no (base) error signal is present, the collector to emitter resistance is relatively high. This high resistance, in series with resistor 122, essentially precludes the flow of current from rectifier 114 to bias winding 206. This bias condition (small current in bias winding 206) allows the main power SCR elements to be turned full on, thereby resulting in maximum voltage and current to the primary of the precipitator high voltage transformer. When a large error signal is present, a relatively high voltage is applied to the base of 124 and the effective resistance thereof drops to a relatively low value. This low value of resistance allows current to flow through resistor 122 and bias winding 206, thereby causing a reduction in the conduction angle on the main SCR elements. This in turn lowers the available voltage to the precipitator supply transformer. The function of resistor 128 and capacitor 130 is to enable the system to make corrections very fast with increasing error signals. With decreasing error signals the response is slowed down. This behavior tends to stop oscillations which are inherent in fast response closed servo loop circuits of this type. With this feedback network in the circuit and upon the occurrence of a short circuit in the precipitator load the error signal applied to the base of 124 is large. This results in cutting off the main SCR firing circuit and phasing back the two main power SCR elements, thereby resulting in a diminution of error signals. When this occurs the main SCR firing control starts to turn on; however, the charging of capacitor 130 supplies a slowly decreasing error signal to the base of transistor 124 which in turn results in a slow turn-on of the SCR firing control to a point where the current error signal corresponds to the current limit point. Under the same conditions described above, but without the feedback network 128, 130, the tendency would be for the main SCR elements to cut off and phase back on the two main power SCR units. This would result in loss of error signal. Immediately after the absence of this signal is detected, the system would turn full on and overshoot the preset limit point which again would result in an error signal turning the set off. This hunting condition would then continue until either the short was removed or the main line circuit breaker turned off. The effect of this feedback action is illustrated at FIGURES 2a and 2b, the former illustrating the action due to 128 and 130, the latter the action without them.

Referring again to FIGURE 1a of the drawings, the description of main SCR firing control section 141 will now be given. The numeral 142 denotes an energizing transformer whose secondary is in series with diode 144, saturable core reactor 146, transformer primary winding 148 of transformer 149, another saturable core reactor device 150, and diode 156. The transformer 142 provides circuit isolation, proper voltage levels, and a center-tapped source for obtaining one trigger pulse in synchronism with each half cycle. In practice, saturable reactors 146 and 150, with associated control windings indicated as on core 140, are of the same saturable reactor system; and together with diodes 144 and 156, constitute a full-wave magnetic amplifier. Control windings 188, 200, 202, 204, and 206 are associated with both cores 146 and 150. There is no separate core 140, which has been illustrated as distinct from 146 and 150 for purposes of clarity. Transformer secondary coil 158 is in series with diode 160 and resistor 162. Similarly, secondary coil 164 is in series with diode 166 and resistor 168. The firing pulses for the main SCR elements appear across resistors 162 and 168. The transformer 149 isolates the firing circuit from the main SCR power lines and also the main SCR units from each other. Diodes 170 and 172 are coupled as indicated across the secondary of transformer 142 to provide a uni-directional current in line 174, the latter coupled to resistors 176, 178 and 180, the latter being coupled to a midterminal of the secondary of transformer 142 through line 182. A Zener diode 184 is located between line 174 and the upper terminal of resistor of 178. A connection through line 186 is made to winding 188 of control windings 140, with the other end of winding 188 coupled to resistor 192 and thence to manually movable arm 194 on resistor 176. A capacitor 196 is coupled across line 186 and 194. The numerals 200, 202 and 204 denote additional control windings of the magnetic amplifier device. Again, it will be understood that core devices 146 and 150 are coupled by control windings 140 so that a current through any of the control coils of 140 influences the magnetic state and hence reactance of devices 146 and 150. It will be apparent that the potential across resistors 176 and 178 is applied across winding 188 to provide a steady-state bias on core devices 146 and 150 through this winding. Zener diode 184 maintains a constant voltage across resistors 176 and 178. The output from diodes 170 and 172 is filtered by 196. With 176–194 set to provide a minimum voltage output, a relatively small current flows in bias coil 188 and there is no core resetting, allowing full 180 degree firing to the main SCR gates. With 176–196 set to provide maximum voltage output, reset current will flow and the gate firing angle will be zero. Thus, manual setting of 176–194 will yield any gate firing angle between zero and 180 degrees for both SCR's.

The numeral 208 denotes a transistor having its collector coupled to a mid-tap of winding 148 and its emitter in series with resistance 210. The tap on coil 148 is also coupled to resistor 212 leading to the base of 208 and thence through diodes 214 and 216 thence to line 182.

As above stated, coil 188 is energized from the steady line power supply from transformer 142. In the absence of any potentials on windings 200 through 206, and with the desired setting of 176–194, the core elements 146 and 150 are fully energized and SCR firing impulses appear across load resistors 162 and 168, alternate positive surges from transformer 142 passing through diodes 144 and 156, respectively, and back through the center tap on winding 148 and line 182. It is important to observe that the windings 200 through 206 are opposite to winding 188 in the sense that any potentials fed to this former group of coils will create currents which act against the current in coil 188 to thereby lower the saturation of core devices 146 and 150 to thereby effect less than full conduction of the main SCR power elements.

The output (SCR gate firing) pulses from transformer 149 are made flat-topped by the transistor 208 and associated elements in the following manner. The transistor is coupled in a series current limiting configuration. Resistor 212 provides a bias for the base of 208 and also a return circuit for 214 and 216, the latter being reference diodes. Resistor 210 is the emitter load resistor. A half cycle pulse fed from 148 will turn on 208 up to a point where the voltage drop across 210 is equal to the voltage drop across voltage reference diodes 214 and 216, thus resulting in a flat-topped waveform for each half-cycle fed to windings 158 and 164.

The triggers for main Silicon-Controlled-Rectifier (SCR) units 220 and 236, generally denoted as thyristors, are transmitted by lines 222 and 224 and by lines 238 and 240. For SCR 220, resistor 232 and capacitor 234 serve as transient voltage suppressors. Diode 226 is in series with 220 and together provide required inverse voltage rating for the system. Resistors 228 and 230 then serve conventional functions for this type of circuit to properly divide the inverse voltage across 220 and 226. The counterparts of these elements for SCR 236, for reasons of obvious symmetery, bear no reference numerals. Lines 242 and 246 supply power to the precipitator 111 and line 246 includes a current limiting inductance 248.

Figure 3:
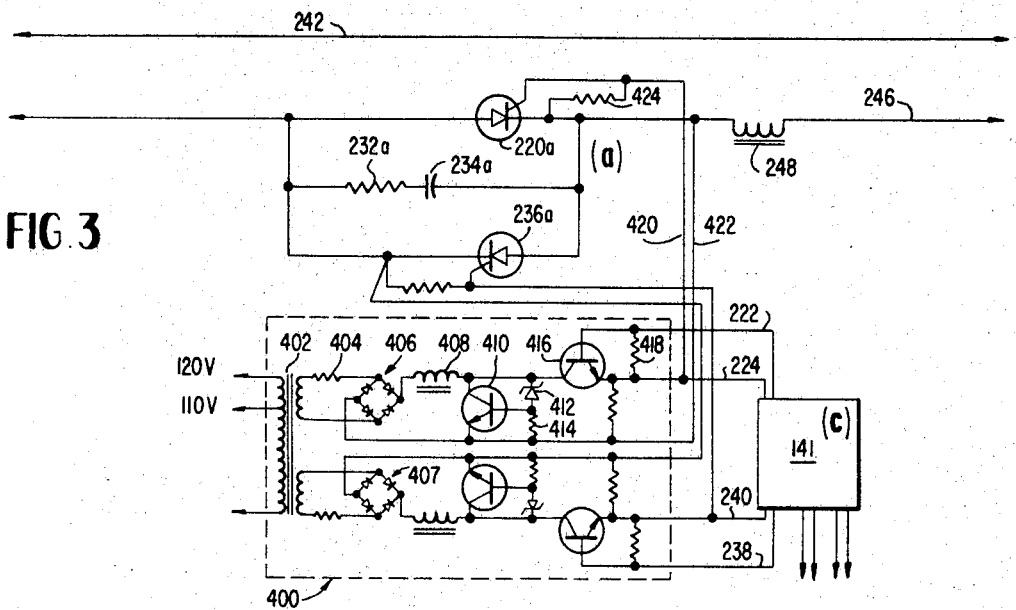

The series arrangement of SCR and diode shown in FIGURE 1a allows use of SCR's with peak inverse voltage ratings less than full line voltage requirement. Use of higher PIV rated SCR's permits circuit simplification as shown in FIGURE 3 and is the preferred method as appropriately rated high voltage SCR's become available at acceptable cost.

Referring again to FIGURE 1b, a description will now be offered of the full parameter voltage control of the automatic voltage regulating system according to the present invention. It will be borne in mind that this subcombination, denoted generally by the elements that lie within the dotted line denoted by 110 automatically and dynamically regulates the voltage fed to the precipitator 111 in accordance with the rate of precipitator sparking current and/or voltage. Thus, a selected, optimum, average precipitator or sparking rate may be automatically maintained with the control system regulating the operating precipitator voltage as required to maintain optimum electrical energization and maximum collection efficiency within the limits imposed by rated maximum high voltage transformer primary current and/or voltage. If, due to to changes in gas, dust characteristics or load, the precipitator operation is no longer limited by sparking, the control system automatically regulates precipitator voltage to that value which permits maximum rated current to flow, thus insuring maximum use of installed rectifier set capacity and maximum available corona power input to the precipitator. In many applications, not infrequent for optimum design, the optimum average sparking rate will occur at a near rated maximum current flow, in which case control signals from both the spark rate channel and current sensing channel dynamically balance precipitator operation at optimum levels. In case of a short-circuit fault condition in the precipitator load, the current limit channel takes over and reduces voltage to an appropriate low level. As soon as the fault is cleared, for example, that due to a full hopper, the automatic controls act immediately to restore normal operation. In some applications, typically where heavy corona current suppression occurs due to treating high concentrations of very fine particles, very high voltages can be used. With generally low currents (fraction of rated capacity) present in such cases, it is necessary to use the voltage sensing channel to automatically prevent operation above the rated voltage of the equipment. In addition, operation within safe levels for the equipment under fault or accidental no-load conditions is automatically provided by the voltage limit servo loop circuit. It is equally clear that any desired operating current or voltage between zero and maximum ratings can also be automatically maintained by appropriately setting control signal reference levels provided in the system design.

Turning now to that portion of this subcombination which controls the current, the numeral 300 denotes the high voltage transformer which supplies the rectifier 109, the output of the latter, in turn, directly supplying high voltage to the electrostatic precipitator 111. The numeral 302 denotes a resistor in series with the primary of transformer 300, the potential drop across this resistance is rather small and is a function of the current in the primary of transformer 300. A transformer 304 boosts the rather small signal voltage across 302 to a usable level and a resistance 306 is coupled across the secondary of transformer 304. The function of resistor 306 and its associated tap is to provide an adjustable current limit setting which is proportioned to the voltage input to rectifier array 308 coupled as indicated across the resistor 306. It will be observed that the setting on 306 from one input terminal of the rectifier 308 may be varied to set this current limit point. The numeral 310 denotes a resistor which limits the charging current to capacitor 312. The resistor 314 has two functions; it functions as a load resistor for the rectifier array 308 and also functions as a ground return to discharge capacitor 312. The numerals 316, 318 and 320 denote silicon diodes which are employed for temperature compensation of Zener diode 322. The Zener diode is used for reference and passes an error signal, derived from the potential across 302, if the error signal exceeds the (20 volt) rating of 322. Resistor 324 limits the error signal current to base of transistor 124, it being observed that the lower end of resistor 324 is coupled to the base of this transistor.

Assume now that resistance 306 is set to control at a certain high voltage transformer primary current, as for example a current of 160 amperes RMS. If the precipitator 111 is running just below its current rating, for example, corresponding to 150 amperes, the voltage at the junction of diodes 320 and 322 will be under 20 volts and no error signal will reach the base of transistor 124 to effect the change in conduction of main SCR units 220 and 236 (by the previously described cooperation between 124, coil 206 on windings 140 and core devices 146 and 150).

In the event that the output of transformer 300 is shorted, a voltage increase will appear across resistor 302. This results in a voltage in excess of 20 volts at the junction of diodes 320 and 322. Any voltage exceeding the 20 volts Zener breakover voltage of diode 322 will appear as an error signal at the base of transistor 124 causing it to turn on and allow current to flow through forcing resistor 122, the winding 206 on magnetic amplifier control windings 140 and rectifier array 114 to ground. The current flow through the coil 206 causes the main SCR unit 220 and 236 to phase back, resulting in a decrease in current to the primary of transformer 300. This decrease in current is sensed by resistance 302, causing the voltage at the junction of diodes 320 and 322 to drop. When this occurs, transistor 124 turns off, allowing the phase and firing control subcombination 141 to turn on SCR units 220 and 236. This action occurs very rapidly, resulting in the loop control circuit dynamically stabilizing at the original current limit set point, here given as an example at 160 amperes. Dynamic balance requires a small error signal to be present, depending upon the overall gain and sensitivity of the system. Thus, it will be observed that if resistor 306 is adjusted for a higher voltage into rectifier array 308, a voltage in excess of the given exemplary voltage of 20 volts will appear at the junction of diodes 320 and 322, thereby causing transistor 124 to turn on allowing current to flow in winding 206 of core device 140 and phasing back the main SCR units 220 and 236 to a point where the required small error signal maintains dynamic circuit balance, thus effecting control at a lower current limit.

A description will now be offered of the subcombination within the dotted lines 110 which effects or controls the voltage. The voltage limit controls the primary voltage of the transformer 300 at its maximum rating. Should load conditions in the precipitator 111 change to a very low current condition, the primary could be overvolted and the rectifier 109 could be damaged. The voltage signal is taken across the primary of transformer 300 by transformer 326. Resistor 328 is variably adjusted as indicated to set the voltage limit point and diode rectifier 330 changes the AC signal to DC. The DC signal is then fed into the same comparator/reference circuit as the previously described current limit. It may be seen from the connection made by line 332 and 334. In practice, by way of one example, a typical adjustment for this voltage control function corresponds to 400 volts RMS on primary of 300. If the voltage exceeds 400 volts, the voltage on Zener diode 322 will exceed 20 volts, causing transistor 124 to turn on and go through the same sequence of control as previously described with respect to the current limit control.

A description will now be offered of that part of the subcombination denoted by the numeral 110 which controls the rate of precipitator sparking in such a manner as to maintain the highest possible voltage on the precipitator 111 by continuously monitoring the spark occurrences in the precipitator and automatically making the adjustments to maintain a selected, predetermined rate of sparking. The result of this action is the continuous operation of the precipitator 111 at its optimum collection efficiency.

Sparking signals within the precipitator are sensed across the primary of transformer 300 by transformer 326, this being the same transformer that is used for the above-described voltage control function. Capacitors 336 and 338 and inductance 340 define a high pass filter, i.e., this filter passes signals above a certain frequency and thus eliminates response to the line frequency. Adjustable resistance 342 adjusts the signals fed to the gate of SCR 344. The cathode of 344 is coupled by line 346 to line 126, and inductance 348 is coupled to the anode of SCR 344. The function of inductance 348 is that of reversing the voltage on capacitor 350 to insure turn off of SCR 344 and to insure that the counter circuit is linear. Resistance 352 isolates the discharge circuit of capacitor 350 from the recharging source provided by power supply 112 and 366. Resistance 354 is coupled in series with spark rate meter 356 and the combination of 354 and 356 defines a voltmeter which reads the voltage on capacitor 358 as a function of average rate of sparking in the precipitator 111. Adjustable resistance 360 determines the spark rate control point. Diode 362 functions as the spark rate reference and allows rates as low as approximately 10 sparks per minute to be set. Resistance 364, in series with diode 362, limits the current to the base of transistor 124 with rectifying array 366 supplying the necessary voltage to this portion of the circuit.

A spark in the precipitator 111 causes a collapse of voltage across the primary of transformer 300. This signal is picked up in the spark sensing transformer 326 and then fed to the symmetrical high pass T filter defined by capacitors 336, 338 and inductance 340. This filter, as previously stated, allows the high frequency portion of the transient which results from the collapsing of the primary voltage to ring across the resistance 342. This high frequency, damped voltage oscillation then fires the gate of SCR 344 causing it to turn on and to thereby discharge pulse condenser 350 through inductance 348. This causes the voltage on capacitor 350 to discharge completely and to reverse polarity. The charging circuit for integrating action is from the positive side of rectifier 366 through resistor 352, pulse condenser 350, integrating condenser 358 and thence to the negative terminal of rectifier 366. In the process of charging condenser 350, a quantity of electric charge is stored in the integrating condenser 358. A voltage proportioned to the average sparking rate is then read in the voltmeter circuit defined by meter 356 and resistor 354. For example, if 100 sparks per minute are fed into the counting circuit, the meter 356 will read 100 and if 200 sparks per minute are fed in, then the meter will read the figure of 200 (the voltmeter having been calibrated in terms of average spark rate).

The spark rate control lever is set by position of variable tap on potentiometer 360 which is connected to diode 362. Diode 362 acts, for example, as a 0.5 volt reference cell. Whenever the voltage between cathode of diode 362 and line 126 exceeds this predetermined reference, given, for example, as 0.5 volt, an error signal will appear at the base of transistor 124 and will turn this transistor on, thereby causing current to flow, as before described, in coil 206 of magnetic amplifier control windings 140 and will result in the phasing back of the main SCR unit 220 and 236 to the point where dynamic balance is maintained.

By way of further example, assume now an average sparking rate in the precipitator of 100 sparks per minute. This will result in approximately 5 volts across the spark rate control resistor 360. This control is adjusted to a point where the voltage impressed on diode 362 is slightly less than 0.5 volt. An increase of ten sparks per minute (0.5 volt) will then produce an error signal which will turn on transistor 124 thereby causing coil 206 of magnetic amplifier control winding 140 to phase back the main SCR units 220 and 236, thereby lowering the voltage fed to the transformer 300 and consequently the sparking rate will be reduced. When the loss of error sparking signal is sensed by transistor 124, it will turn off, thereby diminishing the current in coil 206 and allow the firing control 141 to increase the power fed by units 220 and 236. The integrating condenser 358 charges and discharges rather slowly due to its high capacitance, by way of example, a capacitance of 1000 mfd. This action changes the error voltage on the base of transistor 124 at a rather slow rate resulting in a small incremental change of the spark rate, thereby maintaining a definite spark rate without diminishing the primary voltage on transformer 300 to a point where the collection efficiency of the precipitator 111 would fall off. The net result is to maintain precipitator operation at a desired average spark rate.

Referring now to FIGURE 3 of the drawings, an embodiment of the invention is illustrated which differs from the previously described embodiment (FIGURE 1a) in the addition of a firing circuit amplifier. It will be recalled in the embodiment of FIGURE 1a that the firing circuit was denoted by the numeral 141, with the output from this subcombination circuit being fed through lines 222 and 224 for SCR 220 and through lines 238 and 240 to SCR 236. In certain applications, it has been found desirable to amplify the output to these lines, this output being supplied by transformer 149 of firing control 141. In general, this amplifying circuit is denoted in FIGURE 3 by the numeral 400 with the inputs to firing control 141 being the same as in the previously described embodiment. Accordingly, in FIGURE 3, the firing control 141 is only generally indicated.

The numeral 402 in FIGURE 3 denotes a transformer fed from the indicated power values, with the transformer providing the required low voltage and circuit isolation of the two (to be described) amplifier channels. Resistor 404 limits the current from transformer 402 to rectifier array 406 and filter choke 408 reduces the ripple from the rectifier. At this point, it will be observed that element 407 is identical to element 406 and for reasons of symmetry only one of the amplifying channels, that containing rectifier 406, will be described. The same mode of operation will obviously apply to the channel associated with element 407.

Voltage regulation is realized by the use of a shunt regulator, this regulator consisting of transistor 410, resistor 414 and Zener diode 412. The circuit is self-compensating and functions in the following manner. Assume now that voltage across transistor 410, by way of example, is 10 volts and the break-over voltage of Zener diode 412 is six volts. The collector to emitter resistance of transistor 410 is a function of the voltage applied to its base, i.e., the higher the base voltage, the lower the collector to emitter resistance of transistor 410. The transistor 410 receives an error signal from the Zener diode 412, thereby causing transistor 410 to stabilize at a point which will load the output voltage from 406 and 408 to maintain the six volt break-over of the Zener diode 412. If the voltage across diode 412 would become greater than six volts, the resulting larger error signal will be fed to the base of transistor 410, causing it to decrease the emitter to collector resistance and thereby load the DC output from 406 and 408 to a point where the six volt break-over of the Zener diode is maintained. Should the voltage across the Zener diode 412 decrease, the error signal at the base of 410 would disappear, causing an increase in emitter to collector resistance of 410, thereby allowing the voltage from 406 and 408 to increase until the Zener diode again reached its break-over point and fed an error signal into 410 and again stabilized at six volts.

Transistor 416 is the gate signal amplifier for the main SCR unit 220a and functions in the following manner: A signal from firing control 141 fires into the base-emitter of 416 across resistor 418 causing the collector to emitter resistance to drop to a relatively low value in a short period of time, for example, 60 microseconds. This sudden turn-on then applies the stabilized six volts DC at about, by way of example, 400 ma. to the gate of SCR 220a through line 420, causing the SCR to turn on in about the same time. The duration of conduction of 416 is determined by the signal fed through lines 222 and 224 from firing control 141.

With the use of a relatively large capacity Zener diode 412, it will be apparent that the elements 410 and 414 could be eliminated. It will also be apparent that the mode of operation for the other channel which supplies main SCR 236a is the same.

For convenience, the main SCR units in this embodiment bear the subscripts a, corresponding to the counter parts in the first described embodiment. Here, resistance 424 may be employed for the main SCR units in lieu of the connections illustrated in FIGURE 1a of the drawings for the units. Again, the current limiting reactor 248 is placed in the main power lines feeding the high voltage transformer for the electrostatic precipitator.

CURRENT-LIMITING-REACTOR (CLR)

The reader will observe that both embodiments of the invention employ a current-limiting-reactor 248. Referring to FIGURE 5, a linear reactor is used, typically having a laminated iron core 300' with suitable air gaps 302'a, 302'b, and 302'c in the center leg 304' on which a coil 306' is mounted as shown. The construction is conventionally bolted together with a suitable angle frame (not shown) preferably of non-magnetic material. The total air gap required is broken up into a series of smaller, individual gaps 302 a', b', and c' in order to control the magnetic flux fringing in the region of the air gaps. The segments of the center leg are typically securely held with epoxy and the coil is provided with a number of vertical cooling ducts 308' as illustrated. The term "linear reactor" describes an alternating current choke coil whose inductances or alternating current impedance remains essentially constant as the RMS current is increased up to and including rated load current.

Figure 4A:
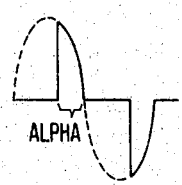
FIGURES 4a and 4b illustrate the effect of the current limiting reactor shown in FIGURE 1a upon the waveform of the pulses supplying the electrostatic precipitator whose voltage is regulated.

Referring now to FIGURE 4a of the drawings, illustrating effects without the use of the CLR, a typical sine wave is illustrated with the first portion thereof shown in dotted lines. The conduction angle is denoted by alpha and this is the angle of conduction of one of the SCR units 220 or 236, or their counterparts in FIGURE 3. As is known to workers in this art, the conduction angle alpha, alternately applied to appropriate SCR on succeeding half waves, may be varied by phase control of the gates of the SCR units, thereby to vary the resultant quantity or amount of current passed by the SCR's. Stated somewhat differently, varying the time of arrival of the trigger voltages to the gates of the SCR units with respect to the external line voltage applied across anode-cathode, different quantities of current will be passed. For example, with a resistance load, the current may be varied from zero to maximum by varying the conduction angle from zero to 180° where the full-half sine wave illustrated will flow. With the system described, one also varies the voltage applied to the transformer primary and hence to the load in a similar manner. For loads, such as a precipitator, where operating voltage commonly may be required below maximum rating of the power supply, usable conduction angles generally lie between 0 and about 90°, the latter corresponding to maximum peak voltage output. Thus, generally, current conduction occurs only up to about 50° of the maximum available, resulting in a poor form-factor with initially very high rates of current rise when conduction starts. With such a waveform, very high peak currents are associated with a given rated RMS current and concurrently the DC or average current available is substantially reduced over that possible with greater conduction angles. In the example shown in FIGURE 4a, a conduction angle alpha of about 72° or about 40% full conduction is illustrated, with the dotted portion of respective half sine waves representing that portion of the impressed voltage or current on the SCR which was not passed.

With a specific load such as an electrostatic precipitator which is normally operated with some average sparking rate for optimum gas cleaning efficiency, such sparking causes momentary load short-circuit and would cause excessive peak current transients capable of destroying the SCR's and/or causing deleterious transformer magnetic circuit unbalance which leads to sustained power arcing and renders the system unstable and unsuitable for energizing precipitators or other high power, sparking loads. Thus, adequate series impedance must be added to the circuit to limit peak current transients during sparking and means must be used to provide the stability essential to reliable operation. The problem of stability becomes more difficult with high power sets.

A simple means for limiting peak currents and power arcing is a series resistance which may be inserted in the primary circuit. With SCR's, an automatic current control feedback circuit may also be employed. Series impedance in the form of a resistance, however, has two basic disadvantages: (1) large amounts of heat and power loss in high power circuits; and (2) system operation is restricted to relatively small conduction angles with correspondingly poor waveform factors. Attempts to solve the problem of control and stability adopted by some workers in the art involves straightforward substitution of SCR's for other conventional control means and reliance on special current sensitive feedback servo control circuits to achieve stability and current limit with sparking. This is generally unsatisfactory, particularly in high power circuits, because of very high peak current during the half-cycle in which a spark occurs and subsequent magnetic circuit unbalance in the high voltage transformer of typical conventional design.

According to the practice of the invention, we have found that inclusion of specially designed series impedance in the form of a current-limiting-reactor, preferably with essentially linear characteristics, denoted as 248 in the circuits illustrated, provides a superior waveform control and stabilizing element in combination with cooperating automatic controls ideally suited to effective use of SCR's for regulating the voltage and power to electrostatic precipitators.

Figure 4B:
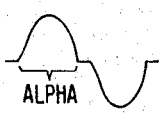

The results are illustrated in FIGURE 4b. The inductive reactance provides essentially almost a sine wave shape and permits voltage control with SCR's at much larger current conduction angles thus improving form-factors, reducing rate of current rise, reducing peak currents and allowing use of full power output capability to the precipitator load. In general, with the use of reactor 248, amplitude control of the voltage to the primary of the transformer is achieved by varying the phase of trigger pulses to the SCR's while increasing the conduction angle alpha beyond 90° to obtain a broader base current pulse to the precipitator. The current waveform in the precipitator is the unidirectional rectified version of FIGURE 4b. By proper design, current conduction of 80–95% of maximum available can be obtained near full load rating.

The voltage drop across reactor 248 increases with load current and is approximately 90° out of phase with the load voltage. Thus, substantial and effective inductive series impedance can be achieved without serious power losses.

The use of the reactor 248 stabilizes the entire operation of the automatic voltage control system, and in combination with the plurality of control signals described, we achieve the objectives and advantages as previously set forth. A precipitator spark, with the CLR and SCR automatic control system of the invention, constitutes a controlled perturbation in the circuit response rather than a huge transient disturbance causing sustained circuit unbalance or catastrophic failure. Peak currents on sparking are typically limited to 2 to 3 times normal, and the response of the plural parameter regulating features of the subject system are speeded up and therefore made more effective with the use of reactor 248. Further, the novel spark transient signal feedback circuit is particularly effective and essential when running a high power set at reduced load, say about 60% or less of rating, where reactive voltage drop and conduction angle are also reduced. The CLR is designed to prevent excessive peak currents on normal operation with adequate spare capacity for higher transient peak currents during a spark. However, if sparking tends to occur for several cycles in succession on the same half wave, under certain load conditions, there could be a possibility of effecting undesirable magnetic circuit unbalance in the high voltage transformer sufficient to unbalance the rectifier output to the precipitator. Under such conditions, not uncommon in prior art systems, a higher-than normal peak voltage immediately following the spark/or sparks can occur which perpetuates undesirable unbalance in the circuit. The special transient feedback signal circuit senses this imminent condition and immediately cuts off the trigger to the SCR's for 1 cycle to allow circuit to recover stably and quickly on the following half cycle. At high load currents near full load rating, the current-sensing signal feedback and limiter becomes active and in cooperating with the transient signal feedback, thte operation is stabilized.

From the detailed description of the subject invention we see that the elements CLR, SCR, automatic control signal circuits, plus high voltage transformer are designed and selected especially to cooperate synergistically as a total system to produce the desired wide-range control and stable operation of difficult sparking loads such as electrostatic precipitators with reliability and economic, efficient use of material for a solution new and not of the prior art.

It has been observed that excellent results are realized when the inductance of the reactor 248 varies not more than 10% from 10% to 100% of rated primary RMS current of the transformer-rectifier set 300, 109. Similar results are obtainable when the effective impedance of the reactor 248 is in the range 30 to 60% of rated primary load impedance at full load of the transformer 300 when the transformer leakage impedance referred to the primary is less than 10%. Further, superior results are realized when the total effective series impedance of the leakage inductance of transformer 300 and the inductance of reactor 248, referred to the primary of 300, is between 35 and 65% of rated primary impedance at full load of the precipitator.

We claim:

1. An automatic voltage control system for an electrostatic precipitator comprising:
   thyristor means for supplying and controlling electrical power to an electrostatic precipitator,
   an inductive element in the output power supply line from said thyristor means,
   means for controlling the conduction of said thyristor means, said means comprising a magnetic device whose state of mangetic core saturation governs said thyristor means.

2. An automatic voltage control system for an electrostatic precipitator including:
   thyristor means for controlling electrical power to an electrostatic precipitator,
   an inductive element in series with said thyristor means,
   means for controlling the conduction of said thyristor means,
   means coupled to said thyristor controlling means for applying an anti-firing bias, and then diminishing the bias to thereby delay the occurrence of firing signals of full strength to said thyristor means.

3. An automatic voltage control system for an electrostatic precipitator including:
   thyristor means for controlling electrical power to an electrostatic precipitator,
   an inductive element in series with said thyristor means,
   means for controlling the conduction of said thyristor means,
   means coupled to said thyristor controlling means responsive to a plurality of operating parameters of an electrostatic precipitator such as voltage, current, and rate of sparking, each operating parameter generating an error signal fed to said thyristor controlling means upon departure from a predetermined amount, feedback means for slowing the response thereof with decreasing error signals, said feedback means inhibiting electrical hunting of the system upon the occurrence of a short circuit.

4. An automatic voltage control system for an electrostatic precipitator comprising:

thyristor means for supplying and controlling electrical power to an electrostatic precipitator, means for controlling the conduction of said thyristor means, means coupled to said thyristor controlling means for allowing line voltage to be impressed upon said thyristor means before the impression of firing signals thereto, and means coupled to said thyristor controlling means for applying an anti-firing bias and thence diminishing the bias to thereby delay the occurrence of firing signals of full strength to said thyristor means.

5. An automatic voltage control system for an electrostatic precipitator comprising:

thyristor means for supplying and controlling electrical power to an electrostatic precipitator, means for controlling the conduction of said thyristor means, means coupled to said thyristor controlling means for applying an anti-firing bias and thence diminishing the bias to thereby delay the occurrence of firing signals of full strength to said thyristor means, means coupled to said thyristor controlling means for cutting off for a limited time only, power supplied by said thyristor means upon the occurrence of a transient in an electrostatic precipitator energized by the system.

6. An automatic voltage control system for an electrostatic precipitator comprising:

thyristor means for supplying and controlling electrical power to an electrostatic precipitator, means for controlling the conduction of said thyristor means, means coupled to said thyristor controlling means for allowing line voltage to be impressed upon said thyristor means before the impression of firing signals thereto, means coupled to said thyristor controlling means for applying an anti-firing bias and thence diminishing the bias to thereby delay the occurrence of firing signals of full strength to said thyristor means, and means coupled to thyristor controlling means responsive to a plurality of operating parameters of an electrostatic precipitator such as voltage, current, and rate of sparking, each operating parameter generating an error signal fed to thyristor controlling means upon departure from a predetermined amount.

7. An automatic voltage control system for an electrostatic precipitator comprising:

thyristor means for supplying and controlling electrical power to an electrostatic precipitator, means for controlling the conduction of said thyristor means, means coupled to said thyristor controlling means for allowing line voltage to be impressed upon said thyristor means before the impression of firing signals thereto, means coupled to said thyristor controlling means for applying an anti-firing bias, and then diminishing the bias to thereby delay the occurrence of firing signals of full strength to said thyristor means, and means coupled to said thyristor controlling means for cutting off for a limited time only, power supplied by said thyristor means upon the occurrence of a transient in an electrostatic precipitator energized by the system.

8. The system of claim 7 wherein said thyristor controlling means comprises a magnetic device whose state of magnetic core saturation governs said thyristor means.

9. An automatic voltage control system for an electrostatic precipitator comprising:

thyristor means for supplying and controlling electrical power to an electrostatic precipitator, means for controlling the conduction of said thyristor means, means coupled to said thyristor controlling means responsive to a plurality of operating parameters of an electrostatic precipitator such as voltage, current, and rate of sparking, each operating parameter generating an error signal fed to said thyristor controlling means upon departure from a predetermined amount, means coupled to said thyristor controlling means for allowing line voltage to be impressed upon said thyristor means before the impression of firing signals thereto, means coupled to said thyristor controlling means for applying an anti-firing bias, and then diminishing the bias to thereby delay the occurrence of firing signals of full strength to said thyristor means, and means coupled to said thyristor controlling means for cutting off for a limited time only, power supplied by said thyristor upon the occurrence of a transient in an electrostatic precipitator energized by the system.

10. The system of claim 9 wherein said thyristor controlling means comprises a magnetic device whose state of magnetic core saturation governs said thyristor means.

11. An automatic voltage control system for an electrostatic precipitator comprising:

thyristor means for supplying and controlling electrical power to an electrostatic precipitator, means for controlling the conduction of said thyristor means, means coupled to said thyristor controlling means responsive to a plurality of operating parameters of an electrostatic precipitator such as voltage, current, and rate of sparking, each operating parameter generating an error signal fed to said thyristor controlling means upon departure from a predetermined amount, means coupled to said thyristor controlling means for allowing line voltage to be impressed upon said thyristor means before the impression of firing signals thereto, means coupled to said thyristor controlling means for applying an anti-firing bias, and then diminishing the bias to thereby delay the occurrence of firing signals of full strength to said thyristor means;

means coupled to said thyristor controlling means for cutting off for a limited time only, power supplied by said thyristor means upon the occurrence of a transient in an electrostatic precipitator energized by the system, feedback means for slowing the response of the means responsive to the plurality of operating parameters with decreasing error signals, said feedback means inhibiting electrical hunting of the system upon the occurrence of a short circuit.

12. The system of claim 11 wherein said thyristor controlling means comprises a magnetic device whose state of magnetic core saturation governs said thyristor means.

13. An automatic voltage control system for an electrostatic precipitator comprising:

thyristor means for supplying and controlling electrical power to an electrostatic precipitator, an inductive element in the output power supply line from said thyristor means, means for controlling the conduction of said thyristor means, means coupled to said thyristor controlling means responsive to a plurality of operating parameters of an electrostatic precipitator such as voltage, current, an rate of sparking, each operating parameter generating an error signal fed to said thyristor controlling means upon departure from a predetermined amount, means coupled to said thyristor controlling means for allowing line voltage to be impressed upon said thyristor means before the impression of firing signals thereto, means coupled to said thyristor controlling means for applying an anti-firing bias, and then diminishing the bias to thereby delay the occurrence of firing signals of full strength to said thyristor means, means coupled to said thyristor controlling means for cutting off for a limited time only, power supplied by said thyristor means upon the occurrence of a transient in an electrostatic precipitator energized by the system, feedback means for slowing the response of the said thyristor controlling means with decreasing error signals, said feedback means inhibiting electrical hunting of the system upon the occurrence of a short circuit.

14. The system of claim 13 wherein said thyristor controlling means comprises a magnetic device whose state of magnetic core saturation governs said thyristor means.

15. An automatic voltage control system for an electrostatic precipitator including:

a transformer-rectifier set, thyristor means for controlling electrical power to an electrostatic precipitator, an inductive element in series with said thyristor means, said inductive element being an iron core, linear reactor in series with the primary of said transformer and whose inductance varies not more than 10% from 10% to 100% of rated primary RMS current of said electrostatic precipitator transformer-rectifier set.

16. The automatic voltage control system of claim 15 wherein:

said thyristor means is a silicon controlled rectifier and wherein the effective impedance of said linear reactor is in the range of 30 to 60% of rated primary load impedance at full load of said transformer in series with said inductive element when said transformer leakage impedance referred to the primary is less than 10%.

17. An automatic voltage control system for an electrostatic precipitator including:

thyristor means for controlling electrical power to an electrostatic precipitator, an iron core inductive element in series with said thyristor means, a transformer coupled to said thyristor means, in which the total effective series impedance of the the transformer leakage inductance and the inductance of said inductive element, referred to the primary at said transformer, is between 35 and 65% of rated primary load impedance at full precipitator load.

References Cited

UNITED STATES PATENTS

| | | | |
|---|---|---|---|
| 2,841,239 | 7/1958 | Hall et al. | 55—105 |
| 2,920,240 | 1/1960 | Macklem | 315—201 |
| 2,961,577 | 11/1960 | Thomas et al. | 55—105 |
| 3,040,496 | 6/1962 | Brown | 55—105 |
| 3,114,097 | 12/1963 | Clarke | 321—18 |
| 3,129,381 | 4/1964 | Manteuffel | 323—24 X |
| 3,147,094 | 9/1964 | Hall et al. | 55—139 X |
| 3,175,076 | 3/1965 | Fox et al. | 219—494 |
| 3,193,725 | 7/1965 | Skirpan | 315—194 |
| 3,241,043 | 3/1966 | Clarke | 321—18 X |
| 3,243,689 | 3/1966 | Perrins | 321—18 X |
| 3,243,711 | 3/1966 | King et al. | |
| 3,262,045 | 7/1966 | Hauck | 321—16 |
| 3,270,270 | 8/1966 | Yenisey | 321—18 |
| 3,317,789 | 5/1967 | Nuckolls. | |
| 3,354,375 | 11/1967 | Poppinger et al. | 321—5 |
| 3,356,927 | 12/1967 | Barron. | |
| 3,358,210 | 12/1967 | Grossoehme | 321—18 |

FOREIGN PATENTS 248,429  10/1963  Australia.

OTHER REFERENCES

Harnden, Jr., J. D., The Controlled Rectifier: Key to the Continuing Control Renaissance, Paper 58–1234 presented at the American Institute of Electrical Engineers Fall general meeting in Pittsburgh, Pa. October 26–31, 1958.

HARRY B. THORNTON, Primary Examiner

D. E. TALBERT, Jr., Assistant Examiner

U.S. Cl. X.R.

55—139; 315—111, 308, 326, 363; 321—18; 323—22, 24